(12) United States Patent
Khafagy et al.

(10) Patent No.: US 11,315,368 B2
(45) Date of Patent: Apr. 26, 2022

(54) METHODS AND SYSTEMS FOR ENGINE START FOLLOWING AN IDLE-STOP

(71) Applicant: Ford Global Technologies, LLC, Dearborn, MI (US)

(72) Inventors: Hafiz Shafeek Khafagy, Dearborn, MI (US); Eric Michael Rademacher, Beverly Hills, MI (US); Ahmed Awadi, Farmington Hills, MI (US); Daniel Yeaw, Dearborn, MI (US); Paul Joseph Szuszman, Ann Arbor, MI (US); Richard John Hippley, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/532,346

(22) Filed: Aug. 5, 2019

(65) Prior Publication Data
US 2021/0043015 A1 Feb. 11, 2021

(51) Int. Cl.
*F02N 11/08* (2006.01)
*G07C 5/08* (2006.01)
*B60K 35/00* (2006.01)

(52) U.S. Cl.
CPC .......... *G07C 5/0825* (2013.01); *B60K 35/00* (2013.01); *F02N 11/0822* (2013.01); *B60K 2370/161* (2019.05); *B60K 2370/167* (2019.05); *F02N 2200/022* (2013.01); *F02N 2200/0802* (2013.01); *F02N 2200/102* (2013.01)

(58) Field of Classification Search
CPC ........ F02D 41/02; F02D 41/06; F02D 41/061; F02D 41/064; F02D 41/065; F02D 41/067; F02D 41/042; F02D 41/26; F02N 11/08; F02N 11/0822; F02N 11/0825; F02N 11/0833; B60K 6/20; B60K 28/04; Y02T 10/48; G07C 5/08; G07C 5/0825; B60T 13/52; B60T 13/662; B60T 13/73; B60T 7/042
USPC ....... 701/110–114; 123/179.3, 179.4, 179.25
See application file for complete search history.

(56) References Cited

U.S. PATENT DOCUMENTS

| | | | |
|---|---|---|---|
| 4,637,359 A * | 1/1987 | Cook | F02N 11/0807 123/179.3 |
| 6,504,259 B1 | 1/2003 | Kuroda et al. | |
| 6,889,125 B2 | 5/2005 | Nakao et al. | |
| 10,113,476 B1 * | 10/2018 | Fulton | B60W 30/18018 |
| 2005/0131622 A1 * | 6/2005 | Braun | F02N 11/0833 701/113 |
| 2007/0027773 A1 | 2/2007 | Lee | |
| 2013/0139776 A1 * | 6/2013 | Pursifull | F02N 11/0844 123/179.3 |

(Continued)

*Primary Examiner* — John Kwon
*Assistant Examiner* — Johnny H Hoang
(74) *Attorney, Agent, or Firm* — Geoffrey Brumbaugh; McCoy Russell LLP

(57) ABSTRACT

Methods and systems are provided for restarting an engine following an engine idle-stop. In one example, a method may include, following a first unsuccessful engine restart attempt, prompting a driver, via a human machine interface (HMI) to apply a brake pedal and upon application of the brake pedal, carrying out one or more restart attempts. If the driver does not apply the brake pedal within the threshold duration, the driver may be prompted to manually restart the engine.

12 Claims, 3 Drawing Sheets

(56) References Cited

U.S. PATENT DOCUMENTS

| | | | |
|---|---|---|---|
| 2015/0031504 A1* | 1/2015 | Reynolds | B60W 10/06 477/93 |
| 2015/0158480 A1* | 6/2015 | Rademacher | B60W 10/06 477/92 |
| 2018/0023493 A1* | 1/2018 | Khafagy | F16H 63/50 477/98 |
| 2018/0058353 A1* | 3/2018 | Khafagy | F02D 41/065 |
| 2019/0153916 A1* | 5/2019 | Kelly | F02B 39/10 |
| 2019/0264645 A1* | 8/2019 | Siddiqui | F02N 11/0822 |
| 2019/0309721 A1* | 10/2019 | Siddiqui | F02N 11/0833 |
| 2020/0080527 A1* | 3/2020 | Khafagy | F02N 11/0822 |

* cited by examiner

METHODS AND SYSTEMS FOR ENGINE START FOLLOWING AN IDLE-STOP

FIELD

The present description relates generally to methods and systems for restarting an engine following an engine idle-stop.

BACKGROUND/SUMMARY

During intermediate vehicle stops such as at a traffic light, an engine may idle for some time. In order to increase fuel efficiency and improve emissions quality, the vehicle engine may be equipped with a start-stop function to reduce prolonged idling by temporarily shutting down the engine. Engine stop may be initiated at non-zero vehicle speed while the vehicle speed is reducing to zero. Upon restart conditions being met, the engine may be restarted by cranking the engine via a starter motor until the engine is driven by combustion.

Various approaches are provided for restarting the engine following an engine idles-top. In one example, as shown in U.S. Pat. No. 6,504,259, Kuroda et al. teaches, during an engine idle-stop condition, the engine may stall due to various reasons. During such an engine stall, an operator may mistakenly recognize that the engine is idle-stopped although the engine actually stalls. In order to improve operator satisfaction, the engine may be automatically restarted regardless of the engine stall and a brake pedal position.

However, the inventors herein have recognized potential issues with such systems. As one example, during an attempt to automatically start an engine following an idle-stop, the engine may not get started in a first attempt and may go out of operation. Such an engine stall may cause dissatisfaction to the operator who is ready to propel the vehicle. In such cases, the operator may be requested via a pop-up message through a human machine interface (HMI) to manually restart the engine which may take a longer time and cause traffic delays.

In one example, the issues described above may be addressed by an engine operating method comprising: automatically stopping an engine, after an automatic engine restart attempt that results in an engine stall, prompting a human driver to apply a brake pedal to start the engine; and requiring a manual engine start to start the engine if the human driver does not apply the brake pedal. In this way, by prompting the operator to engage a brake pedal prior to an engine restart attempt, engine restart may be facilitated within a shorter time.

As one example, in response to idle-stop conditions being met (such as in response to a longer than threshold duration of engine idling), an engine idle-stop may be initiated and engine combustion may be suspended. An idle-stop is an event during which, upon conditions being met, the engine is automatically stopped by suspending fueling and spark to reduce fuel consumption and improve emissions quality. In response to conditions being met for the engine to restart, in a first restart attempt, the engine may be cranked via a starter motor until the engine speed reaches a threshold (such as idling speed). However, if the first restart attempt fails, the engine may stall. If the brake pedal is not engaged during the first restart attempt, an operator may be prompted via a message displayed in a HMI to engage the brake pedal. Once the brake pedal has been engaged, one or more successive restart attempts may be carried out within a threshold duration since the first restart attempt. If the brake pedal is already engaged during the first restart attempt, the one or more successive restart attempts may be carried out within the threshold duration since the first restart attempt. If the engine could not be restarted after multiple restart attempts within the threshold duration, the operator may be prompted via another message displayed in the HMI to shift the transmission position to park and manually restart the engine.

In this way, in response to a stalled engine during a restart attempt from an engine idle-stop, by requesting an operator to engage a brake pedal, the engine may be restarted within a shorter time after the operator engages the brake pedal. Having the operator engage the brake pedal may help ensure that the vehicle does not move during an engine restart event and may help confirm that the driver is still in a position to control the vehicle. The technical effect of repeatedly attempting to restart the engine within a specified duration is that the requirement of manual engine restart may be reduced. By improving engine idle-stop and restart mechanism, fuel efficiency and emissions quality may be improved. Overall, by restarting the engine within a shorter duration, customer satisfaction may be improved and traffic delays may be minimized.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
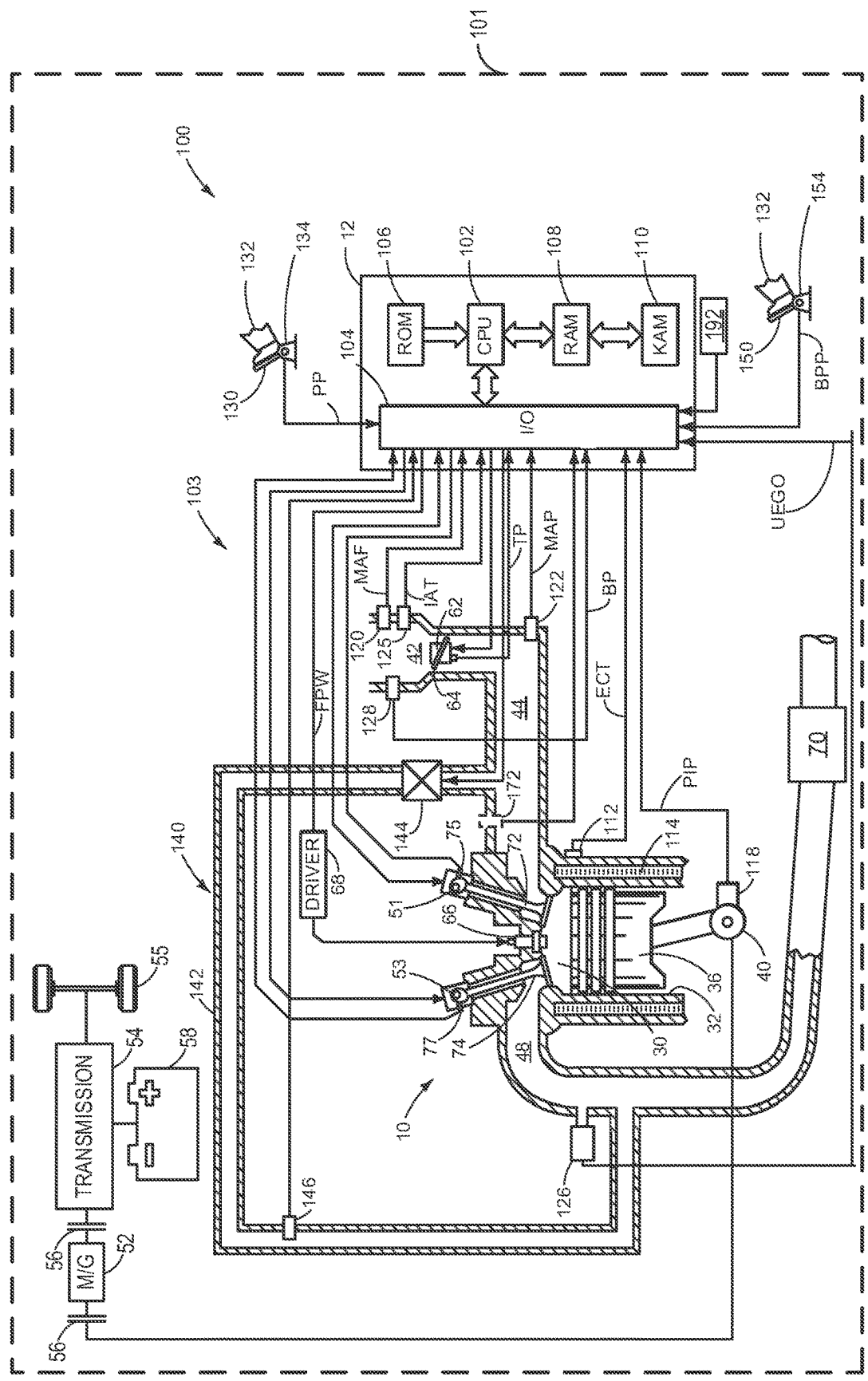
FIG. 1 shows an example vehicle system including an engine system.

The following description relates to systems and methods for restarting an engine following an engine idle-stop. An engine, as shown in FIG. 1, may be opportunistically shut-down during a drive cycle to improve fuel efficiency and emissions quality. An engine controller may be configured to perform control routines, such as the example routine of FIG. 2 to idle-stop an engine when conditions are met and then to restart the engine. An example of engine restart following an idle-stop is shown in FIG. 3.

FIG. 1 is a schematic diagram showing a vehicle system 100 comprising a vehicle 101 and an engine system 103. FIG. 1 shows one cylinder of a multi-cylinder engine 10 in the engine system 103. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal PP. The operator 132 may also engage a brake pedal 150 to generate and a brake position BPP may be generated via a brake position sensor 154.

A combustion chamber (cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10. A position of the crankshaft may be determined via a Hall effect sensor (crankshaft signal sensor) 118 coupled to the crankshaft 40. In one example, the sensor 118, which is also used as an engine speed sensor, may produce a predetermined number of equally spaced pulses every revolution of the crankshaft. Based on an engine speed, as determined based on input from the sensor 118, the controller may determine a corresponding engine sound produced during engine operation.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 72 and exhaust valve 74. In some embodiments, the combustion chamber 30 may include two or more intake valves and/or two or more exhaust valves.

In this example, the intake valve 72 and exhaust valve 74 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 72 and exhaust valve 74 may be determined by position sensors 75 and 77, respectively. In alternative embodiments, the intake valve 72 and/or exhaust valve 74 may be controlled by electric valve actuation. For example, the combustion chamber 30 may alternatively include an intake valve controlled via electric valve actuation and an exhaust valve controlled via cam actuation including CPS and/or VCT systems.

A fuel injector 66 is shown coupled directly to combustion chamber 30 for injecting fuel directly therein in proportion to the pulse width of signal FPW received from the controller 12 via an electronic driver 68. In this manner, the fuel injector 66 provides what is known as direct injection of fuel into the combustion chamber 30. The fuel injector may be mounted in the side of the combustion chamber or in the top of the combustion chamber (as shown), for example. Fuel may be delivered to the fuel injector 66 by a fuel system (not shown) including a fuel tank, a fuel pump, and a fuel rail. In some embodiments, the combustion chamber 30 may alternatively or additionally include a fuel injector arranged in the intake manifold 44 in a configuration that provides what is known as port injection of fuel into the intake port upstream of the combustion chamber 30.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal TP.

The air intake passage 42 may include the intake air temperature (IAT) sensor 125 and the barometric pressure (BP) sensor 128. The IAT sensor 125 estimates intake air temperature to be used in engine operations and provides a signal to the controller 12. Similarly, the BP sensor 128 estimates the ambient pressure for engine operations and provides a signal to the controller 12. The intake passage 42 may further include a mass air flow sensor 120 and a manifold air pressure sensor 122 for providing respective signals MAF and MAP to the controller 12.

An exhaust gas sensor 126 is shown coupled to the exhaust passage 48 upstream of an emission control device 70. The sensor 126 may be any suitable sensor for providing an indication of exhaust gas air/fuel ratio (AFR) such as a linear oxygen sensor or UEGO (universal or wide-range exhaust gas oxygen), a two-state oxygen sensor or EGO, a HEGO (heated EGO), a NOx, HC, or CO sensor.

The emission control device 70 is shown arranged along the exhaust passage 48 downstream of the exhaust gas sensor 126. The device 70 may be a three-way catalyst (TWC), NOx trap, various other emission control devices, or combinations thereof. In some embodiments, during operation of the engine 10, the emission control device 70 may be periodically reset by operating at least one cylinder of the engine within a particular air/fuel ratio.

Further, an exhaust gas recirculation (EGR) system 140 may route a desired portion of exhaust gas from the exhaust passage 48 to the intake manifold 44 via an EGR passage 142. The amount of EGR provided to the intake manifold 44 may be varied by the controller 12 via an EGR valve 144. Further, an EGR sensor 146 may be arranged within the EGR passage 142 and may provide an indication of one or more of pressure, temperature, and constituent concentration of the exhaust gas. A linear oxygen sensor 172 may be positioned at the intake passage, downstream of the intake throttle, to facilitate EGR regulation. Under some conditions, the EGR system 140 may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

During conditions when the operator torque demand decreases to below a threshold, such as when the vehicle is stopped at a traffic signal, the engine may idle until the torque demand increases. Prolonged idling may adversely affect fuel economy and emissions quality. In response to engine idle-stop conditions being met, an automatic start-stop operation may be carried out to reduce the duration of engine idling. For example, if it is determined that the engine has been idling for longer than a threshold duration, combustion may be suspended, and engine operation may be stopped (idle-stop). In response to engine idle-start conditions being met, engine may be restarted (idle-start) and combustion may be resumed.

However, the engine may not readily restart in response to a first restart attempt. If the engine stalls after a first restart attempt, a human driver may be prompted by displaying a message via a human machine interface (HMI), the HMI including a display coupled to a vehicle dashboard 192 and/or a display of a smart phone operated by the human driver to apply the brake pedal 150. One the brake has been applied, one or more engine restart attempts may be carried out within a threshold duration. During a condition when the first restart attempt is carried out with the brake pedal being applied, the one or more engine restart attempts may be carried out within the threshold amount of time without prompting the human driver. In one example, the one or more restart attempts may be successively carried out with a threshold gap between two consecutive restart attempts. Each of the first engine restart attempt and the one or more restart attempts may include cranking the engine via a starter motor and enabling fuel injection and spark to one or more engine cylinders until an engine speed increases to a threshold speed and/or a threshold cranking duration is completed. In response to the human driver not applying the brake pedal within the threshold amount of time, the human driver may be prompted via the HMI to manually restart the engine. The manual restart may include the human driver shifting a transmission gear position to park and then switching on an ignition key switch.

The controller 12 is shown in FIG. 1 as a microcomputer, including a microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10, in addition to those signals previously discussed, including measurement of exhaust and intake AFR from oxygen sensors 126 and 172 respectively, inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to crankshaft 40; throttle position (TP) from a throttle position sensor; and absolute manifold pressure signal, MAP, from the sensor 122. Engine speed signal, RPM, may be generated by the controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder.

The storage medium read-only memory 106 can be programmed with computer readable data representing non-transitory instructions executable by the processor 102 for performing the methods described below as well as other variants that are anticipated but not specifically listed. As described above, FIG. 1 shows one cylinder of a multi-cylinder engine, and each cylinder may similarly include its own set of intake/exhaust valves, fuel injector, spark plug, etc.

The controller 12 receives signals from the various sensors of FIG. 1 and employs the various actuators of FIG. 1 to adjust engine operation based on the received signals and instructions stored on a memory of the controller 12. In one example, in response to a lower than threshold engine load for a longer than threshold duration, the controller may initiate an engine idle-stop by sending a signal to the fuel injectors 66 to suspend engine cylinder fuel injection.

In some examples, vehicle 101 may be a hybrid vehicle with multiple sources of torque available to one or more vehicle wheels 55. In other examples, vehicle 101 is a conventional vehicle with only an engine, or an electric vehicle with only electric machine(s). In the example shown, vehicle 101 includes engine 10 and an electric machine 52. Electric machine 52 may be a motor or a motor/generator. Crankshaft 40 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

In this way, the system of FIG. 1 enables a system for a vehicle comprising: a controller with computer readable instructions stored on non-transitory memory that when executed enable the controller to: in response to conditions being met for an engine idle-stop, suspend fueling and spark to one or more engine cylinders to idle-stop an engine, during the idle-stop, upon conditions being met for an engine restart, after carrying out a first engine restart attempt resulting in engine stall, prompt an user, via an on-board human machine interface (HMI), to apply a brake pedal with a threshold duration since the first engine restart attempt, and upon application of the brake pedal, carry out a one or more successive engine restart attempts.

Figure 2:
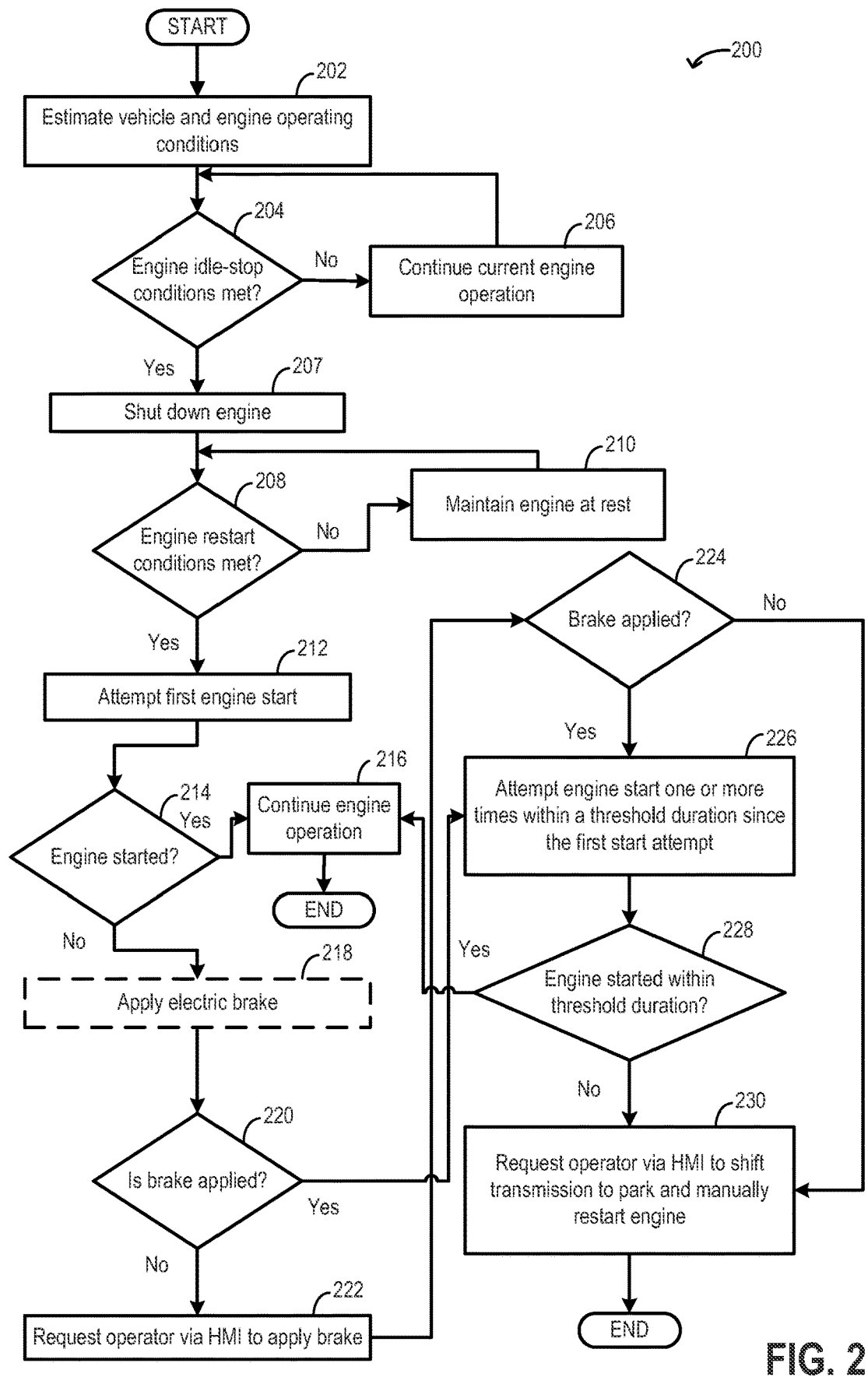
FIG. 2 shows a flow chart illustrating an example method that can be implemented to carry out an engine idle-stop and subsequent restart.
Figure 3:
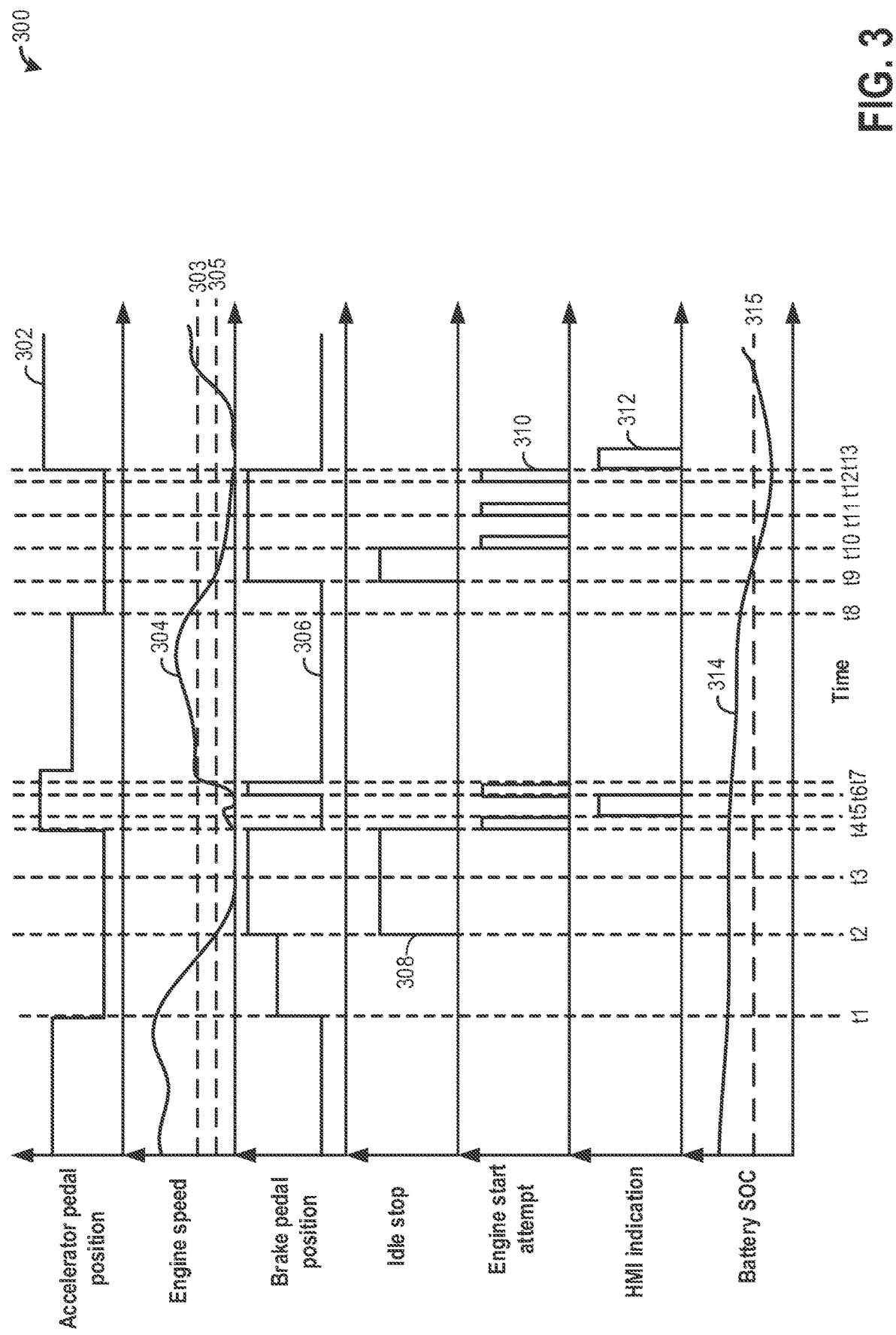
FIG. 3 shows an example of an engine idle-stop followed by an engine restart.

FIG. 2 shows an example method 200 for carrying out an engine idle-stop and subsequent restart after an engine stall. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, current vehicle and engine operating conditions may be estimated and/or measured. These may include, for example, operator torque demand, engine speed, vehicle speed, engine temperature, engine load, ambient conditions (such as ambient humidity, temperature, and barometric pressure), exhaust temperature, manifold pressure, manifold air flow, battery state of charge, etc.

At 204, the routine includes determining if engine idle-stop conditions are met and if engine spin-down may be initiated. Conditions for engine idle-stop may include engine idling for a longer than threshold duration. For example, engine idling may take place while the vehicle is at a traffic stop when the engine load is below a threshold (such as when the vehicle is stationary). Engine operation at the idling speed for a longer than threshold duration may result in increased fuel usage and increased level of exhaust emissions. Also, the threshold duration may be based on fuel level in the fuel tank. In one example, if the fuel level in the fuel tank is lower than a threshold level, the threshold duration may be decreased such that additional fuel may not be consumed for engine idling.

Engine idle-stop conditions may further include a greater then battery state of charge (SOC). The controller may check battery SOC against a preset minimum threshold and if it is determined that the battery SOC is at least more that 30% charged, automatic engine stop may be enabled. The engine idle-stop conditions may further include a higher than threshold battery voltage level. Confirming engine idle-stop conditions may further include an indication that a motor of a starter/generator is operation ready. The driver requested torque may be estimated and confirmation of an engine idle-stop may be initiated in response to a lower than threshold driver requested torque. The vehicle speed may be estimated and assessed whether it is below a predetermined threshold. For example, if the vehicle speed is lower than a threshold (e.g., 3 mph) an engine idle-stop may be requested even if the vehicle is not at rest. Further, an emission control device coupled to the exhaust manifold of engine may be analyzed to determine that no request for engine restart was made. Idle-stop enabling conditions may also include, a higher than threshold brake booster vacuum, a lower than threshold vehicle gradient, a lower than threshold steering angle, and a rate of steering lower than a threshold of steering velocity.

The status of an air conditioner may be checked and before initiating an engine idle-stop, it may be verified that the air conditioner did not issue a request for restarting the engine, as may be requested if air conditioning is desired. The intake air temperature may be estimated and/or measured to determine if it is within a selected temperature range. In one example, the intake temperature may be estimated via a temperature sensor located in the intake manifold and an engine idle-stop may be initiated when the intake air temperature is above a lower threshold temperature (such as above 0° C.) or below a higher threshold temperature (such as below 40° C.). Also, the engine temperature may be estimated and/or measured to determine if it is within a selected temperature range. In one example, the engine temperature may be inferred from an engine coolant temperature and an engine idle-stop may be initiated when the engine coolant temperature is above a threshold engine temperature.

Further, an engine may not be idle-stopped if a driver unbuckles his seat belt, opens the driver-side door, and/or releases a brake pedal while the transmission gear is selected as drive (for automatic transmission) or non-neutral (for manual transmission). In a vehicle equipped with a manual transmission system, for the engine to idle-stop, the transmission is to be at neutral and the clutch pedal is to be engaged. In a vehicle equipped with an automatic transmission system, for the engine to idle-stop, the brake pedal has to be engaged such that the transmission system may decouple and no longer provide torque to the vehicle wheels.

If it is determined that engine idle-stop conditions are not met, at 206, current engine operations may be continued without initiating the engine start-stop operation such as the engine may be maintained running with cylinders combusting fuel. If it is confirmed that engine idle-stop conditions are met, at 207, combustion may be suspended to shut-down the engine. In order to suspend combustion, fueling to the engine cylinders may be suspended. The controller may send a signal to one or more fuel injectors (such as fuel injector 66 in FIG. 1) coupled to the engine cylinders to stop fuel injection to each of the cylinders. Also, the controller may send a signal to spark plugs coupled to each cylinder to disable spark. In addition, cylinder valve operation may be suspended. Once the combustion is suspended, the engine may spin-down and the engine speed may gradually decrease to zero.

The engine may be idle-stopped in a plurality of scenarios. In one example scenario may include an operator stopping at a stop sign, stopping while waiting to turn left, stopping at a traffic light, or stopping at a drive through with the brake engaged. In another example scenario, as the operator applies the brake, the vehicle speed may reduce below a threshold speed and the engine may be idle-stopped prior to the vehicle coming to rest. Certain vehicles may be equipped with an automatic electronic brake (also referred as auto hold feature) which may stop the vehicle from moving and the auto hold feature may be applied (either by the operator or automatically by the controller) during an engine idle-stop to stop the vehicle from moving such as when the vehicle is on a slope. Certain vehicles may be equipped with an active/adaptive cruise control system wherein based on a traffic pattern ahead of the vehicle. As an example, a vehicle may be auto-stopped by the control system. If a lead vehicle ahead of the vehicle stops, the active/adaptive cruise control system may stop the vehicle even if the driver does not engage the brake. During such a traffic stop, the engine may be idle-stopped. At 208, the routine includes determining if engine restart conditions are met. In one example, engine restart conditions following an engine idle-stop may include an increase in engine load. In one example, the controller may determine if the brake pedal is released. The accelerator pedal position may also be determined, for example via a pedal position sensor, to determine whether the accelerator pedal has been engaged in addition to the release of the brake pedal. The status of the air conditioner may be checked to verify whether a request has been made to restart, as may be made when air conditioning is desired. The SOC of battery may be estimated to estimate if it is below a predetermined threshold. In one example, it may be desired that battery be at least 30% charged. Accordingly, engine starting may be requested to charge the battery to a desired value.

The engine restart conditions may further include, a request from an emission control device to restart the engine has been made. In one example, the emission control device temperature may be estimated and/or measured by a temperature sensor, and if the temperature is below a predetermined threshold, an engine restart may be requested. The vehicle speed may be estimated and assessed whether it is above the predetermined threshold. For example, if the vehicle speed is greater than a threshold (e.g., 3 mph) an engine start may be requested. It may be determined whether the electrical load of the engine is above a predetermined threshold, in response to which an engine start is requested (e.g., to reduce draining of the battery). In one example, the electrical load may comprise user operated accessory devices, electrically powered air-conditioning, etc. Engine restart conditions may also include invention by vehicle operator such as opening of driver side door or unbuckling the driver's seatbelt. In a vehicle equipped with manual transmission, a condition for engine restart may include the operator shifting the gear position from neutral to a forward/reverse position.

If it is determined that the engine restart conditions have not been met, at 210, engine may be maintained in the stopped condition, and combustion may not be resumed. If it is determined that engine restart conditions are met, at 212, a first engine start attempt may be carried out. The controller may send a signal to a starter motor to crank the engine. The controller may also send a signal to the fuel injectors coupled to the engine cylinders to initiate fueling. Further, the controller may send a signal to the spark plugs coupled to the engine cylinders to initiate spark. During the cranking, fueling and spark may be continued until a threshold engine speed is reached. However, the engine may not start at the first attempt and the engine may stall. Engine stall may occur due to one or more engine cylinders not getting a desired amount of air, fuel, or spark, a mechanical failure, a sudden increase in engine load, or slow engine cranking caused by lower battery state of charge.

At 214, the routine includes determining if the engine is started following the first engine start attempt. As an example, an engine start may be defined as the engine reaching a threshold speed such as idling speed during cranking and subsequently switching off the starter motor to operate the engine by combusting fuel and air in the engine cylinders. The engine may be cranked for a threshold cranking duration and then if the engine speed does not increase to the threshold speed and the engine is unable to sustain operation via combustion, an engine start attempt may be deemed as unsuccessful. If it is determined that the engine has been successfully started such as the engine has reached the threshold speed and is being operated via combustion, at 216, engine operation may be continued without operation of the starter motor. The controller may send a signal to the actuator of the starter motor to deactivate the starter motor while continuing fueling and spark to the engine cylinders.

If it is determined that the engine has not started following the first engine start attempt, such as if after cranking the engine via a starter motor for over the threshold cranking duration, the engine cannot be operated (spun) by combusting, it may be inferred that the engine has stalled following the first engine restart attempt during an engine idle-stop and the routine may proceed to 218.

At 218, an electric parking brake (EPB) may be applied. The controller may actuate the EPB in vehicles that are equipped with an EPB system. This step is optional and the routine may also directly move from 214 to 220.

At 220, the routine includes determining if a brake pedal has been applied (engaged) via an input from a brake pedal sensor. As an example, the brake pedal may be applied if the operator engages the brake pedal with his foot. In one example, when the operator wishes to move the vehicle, he may release the brake pedal and engage the accelerator pedal. In another example, when the vehicle is restarted from idle-stop not responsive to the operator's request to move the vehicle but due to a systems requirement such as if the battery state of charge (SOC) decreases to below the threshold SOC or the temperature of the after treatment device reduces to below the threshold temperature, the operator may continue to engage the brake pedal during an engine restart attempt.

If it is determined that the brake pedal is not applied by the operator, at 222, the operator may be requested, via a human machine interface (HMI) to apply the brake pedal such as by engaging the brake pedal with his foot. In one example, the operator may be requested to apply the brake with a threshold duration of time. In another example, the operator may be requested to apply the brake a threshold number of times (such as tapping the brake twice). In yet another example, the operator may be requested to apply a threshold effort on the brake pedal such as engaging the brake pedal and holding the pedal at a threshold pressure for a specified duration.

In one example, a HMI such as touch screen may be housed in the vehicle dashboard (such as the instrument panel) and the HMI may display a message for the vehicle operator (human driver). In another example, the HMI may be a smart device (smart phone, tablet, etc.) display, a computer monitor, wherein the smart device/computer is communicatively coupled to the engine controller.

At 224, the routine includes determining if the brake has been applied by the operator. The routine may determine if the brake has not been applied within a first threshold duration since the request for brake application was made to the operator. The routine may further determine if the brake has been applied the threshold number of times and/or with the threshold effort. In one example, the operator may see the message on the HMI and apply the brake shortly thereafter. In another example, the operator may not notice the displayed message and may not apply the brake within the first threshold duration, the threshold number of times, or with the threshold effort. The controller may determine if the brake pedal has been engaged based on feedback from a brake pedal sensor. By engaging the brake pedal, it may be ensured that the vehicle is in a stationary, defined state and the operator is responsive.

If it is determined that the brake has been applied by the operator, the routine may proceed to step 226 since the brake pedal application ensures the vehicle does not move during an engine restart. Also, if at step 220 it was determined that the brake was already applied by the operator, the routine may directly proceed to step 226.

At 226, engine start may be attempted one or more times within a second threshold duration since the first engine start attempt. As an example, a second engine restart attempt (and each subsequent engine restart attempts) may include cranking the engine via a starter motor while continuing fueling and spark until the threshold engine speed (such as idling speed) is reached and then deactivating the starter motor. In one example, in each restart attempt, the engine cranking (via starter motor) may be carried out for a threshold cranking duration and if it is determined that the engine is not started during the restart attempt, a subsequent restart attempt may be immediately carried out. In another example, if it is determined that the engine is not started due to the restart attempt, a subsequent restart attempt may be carried out after a predetermined duration (such as three seconds) has elapsed from the immediately prior restart attempt. As an example, the number of restart attempts permissible within the second threshold duration may be pre-calibrated based on vehicle operating conditions (such as engine temperature, engine load, etc.) and emissions regulations. The controller may retrieve from its memory, the number of engine restart attempts that may be carried out within the second threshold duration. As an example, three restart attempt may be carried out after the first unsuccessful restart attempt. Each restart attempt may be carried out upon confirmation that the immediately previous restart attempt has been unsuccessful.

At 228, the routine includes determining if the engine has been started within the second threshold duration. As an example, an engine start may be defined as the engine reaching a threshold speed such as idling speed during cranking and subsequently switching off the starter motor to operate the engine by combusting fuel and air in the engine cylinders. The engine may be cranked for the threshold cranking duration and then if the engine speed does not increase to the threshold speed and the engine is unable to sustain operation via combustion, an engine start attempt may be deemed as unsuccessful.

If it is determined that the engine could be started within the second threshold duration, the routine may proceed to step 216 and engine operation may be continued. However, if it is determined that the engine has not been started even after a plurality of attempts, at 230, the operator may be requested via a message displayed on the HMI to shift transmission to park and to manually restart the engine.

Also, if at 224 it is determined that the brake was not applied by the operator, the routine may proceed to step 230 to manually restart the engine. In this way, manual engine restart may be carried out only if the brake is not applied by the operator upon being prompted.

Manual engine restart may include, the operator first turning the ignition key to an off position and then turning the ignition key to an on position. In vehicles equipped with an ON/OFF switch, the operator may manually press the switch (button) to first turn OFF and then to turn ON the engine. During the manual engine restart, the operator may keep the brake engaged. Once the engine is started, the transmission gear position may be shifted to a forward/reverse position and the vehicle may be moved.

In this way, following an unsuccessful first attempt to restart an engine, during a first condition, engine start may be attempted one or more times within a first threshold duration from the first attempt, and during a second condition, a vehicle operator may be prompted, via a display device, to engage a brake pedal within a second threshold duration from the first attempt and then upon brake pedal engagement, the engine start may be attempted one or more times within the first threshold duration from the first attempt, the first threshold duration longer than the second threshold duration. The first condition may include the brake pedal being engaged during the first attempt and the second condition may include the brake pedal not being engaged during the first attempt.

FIG. 3 shows an example operating sequence 300 illustrating an engine idle-stop followed by engine restart. The horizontal (x-axis) denotes time and the vertical markers t1-t11 identify significant times in engine operation.

The first plot, line 302, shows accelerator pedal position as estimated via an accelerator pedal position sensor. The second plot, line 304, shows engine speed as estimated via a crankshaft position sensor. Dashed line 303 denotes a threshold engine speed above which the engine is idling. Dashed line 305 denotes a threshold engine speed below which the engine is idle-stopped if the brake pedal is engaged and the accelerator is not applied. The threshold engine speed 305 is pre-calibrated based on engine operating conditions such as engine load, engine temperature, etc. The third plot, line 306, shows brake pedal position as estimated via a brake pedal position sensor. The fourth plot, line 308, shows times when the engine in in an idle stop condition. Engine idle stop condition includes a longer than threshold duration of engine idling. Upon satisfying engine idle-stop conditions, the engine is automatically stopped with fueling and spark disabled. The fifth plot, line 310, shows an engine start attempt. During an engine start attempt, the engine is cranked via a starter motor while fueling and spark is resumed. The cranking is continued until a threshold engine speed is reached and/or a threshold cranking duration is reached since the start of the starter motor. The sixth plot, line 312, shows an indication on a human machine interface such as a dashboard display that is visible to the vehicle operator. The seventh plot, line 314, shows a state of charge (SOC) of an on-board battery which may be used to propel a vehicle. The battery is charged by engine operation. Dashed line 315 denotes a threshold SOC below which the engine is not idle-stopped.

Prior to time t1, the engine is operated to propel the vehicle and the engine speed is adjusted based on driver torque demand which is proportional to the accelerator pedal position. During this time, the brake pedal is not applied by the operator and the battery SOC is maintained above the threshold SOC 315. At time t1, in response to an accelerator tip-out and brake pedal engagement, the engine speed reduce. Between time t1 and t2, the engine speed continues to decrease due to reduced driver torque demand. At time t2, the brake pedal is further applied. In response to the engine speed decreasing to below the threshold engine speed 305, at time t2, the engine is idle-stopped. The controller sends a signal to the fuel injectors coupled to the engine cylinders to suspend fueling. Also, the controller sends a signal to spark plugs coupled to engine cylinders to suspend spark. By discontinuing fueling and spark, the engine is automatically stopped. At time t3, the engine speed reduces to zero and the engine is idle-stopped until time t4.

At time t4, the brake pedal is released and the accelerator pedal is applied. In response to the tip-in, the controller sends a signal to an actuator coupled to the starter motor to crank the engine in a first attempt is made to restart the engine. The controller may also send a signal to the fuel injectors coupled to the engine cylinders to initiate fueling. Further, the controller may send a signal to the spark plugs coupled to the engine cylinders to initiate spark. The cranking is continued until time t5 when a threshold cranking duration is reached since the start of the starter motor at time t4 but the engine speed does not reach the idling speed 303. Based on the engine speed not reaching the idling speed, it is inferred that the first engine start attempt has been unsuccessful. At this time, the controller may send a signal to stop cranking the engine, as well as signals to stop fuel and spark.

Between time t5 and t6, a message is displayed on an on-board HMI requesting the operator to apply the brake pedal. In response to the operator applying the brake pedal at time t6, a second engine restart attempt is made by cranking the engine via the starter motor. Following the second engine start attempt, at time t7, the engine speed increases to the idling speed 303 and starter motor operation is discontinued.

Between time t7 and t8, the engine is operated without an idle-stop. At time t8, in response to a tip-out, the engine speed decreases. At time t9, the brake pedal is applied and the engine speed reduces to the threshold engine speed 305. In response to the engine speed reducing to below the threshold engine speed 305, the engine is idle-stopped at time t9.

However, at time t10, due to the battery SOC reducing to below the threshold SOC, an engine restart is requested even before the engine speed reduced to zero. A first restart attempt is carried out at time t10 but the attempt is unsuccessful. Hence a second engine start attempt is carried out at time t11 which was also unable to start the engine. A third and final engine start attempt is made at time t12 which also remained unsuccessful and the engine speed reduces to zero at time t13. At time t13, in response to completion of a threshold duration since the first engine cranking attempt (following the current engine idle-stop) at time t10, a massage is displayed to the operator via the HMI to manually restart the engine such as by turning the ignition key to a start position. Once the engine is manually started by the operator, the engine speed increases.

In this way, by requesting an operator to engage the brake in response to a stalled engine following an engine restart attempt after an engine idle-stop, the engine may be restarted with minimal operator assistance without a need for a manual restart. By reducing a need for manual restart, engine start times may be reduced, thereby improving operator satisfaction and not causing undesired delays in traffic.

In one example, an engine operating method, comprises: automatically stopping an engine; after an automatic engine restart attempt that results in an engine stall, prompting a human driver to apply a brake pedal to start the engine, and requiring a manual engine start to start the engine if the human driver does not apply the brake pedal within a threshold amount of time. In the preceding method, additionally or optionally, the human driver is prompted by displaying a message via a human machine interface (HMI), the HMI including a display coupled to a vehicle dashboard and/or a display of a smart phone operated by the human driver. In any or all of the preceding examples, additionally or optionally, the automatically stopping the engine is in response to a higher than threshold duration of engine idling with a vehicle speed below a threshold speed. In any or all of the preceding examples, additionally or optionally, the automatic engine restart attempt includes a first engine restart attempt in response to conditions being met for an engine restart, the conditions including an increased engine torque demand. Any or all of the preceding examples, the method further comprising, additionally or optionally, upon application of the brake pedal, carrying out one or more engine restart attempts within the threshold amount of time. In any or all of the preceding examples, the method further comprising, the additionally or optionally, in response to the automatic restart attempt being carried out with the brake pedal being applied, carrying out the one or more engine restart attempts within the threshold amount of time without prompting the human driver. In any or all of the preceding examples, additionally or optionally, the one or more restart attempts are successively carried out with a threshold gap between two consecutive restart attempts. In any or all of the preceding examples, additionally or optionally, each of the first engine restart attempt and the one or more restart attempts include cranking the engine via a starter motor and enabling fuel injection and spark to one or more engine cylinders until an engine speed increases to a threshold speed and/or a threshold cranking duration is completed. In any or all of the preceding examples, additionally or optionally, the engine stall includes engine speed not increasing to the threshold engine speed within the threshold cranking duration and then the engine speed reducing to zero. In any or all of the preceding examples, further comprising, additionally or optionally, in response to the human driver not applying the brake pedal within the threshold amount of time, prompting the human driver to manually restart the engine. In any or all of the preceding examples, additionally or optionally, the manual engine start includes, the human driver shifting a transmission gear position to park and then switching on an ignition key switch.

Another example method for a vehicle comprises: following an unsuccessful first attempt to restart an engine, during a first condition, attempting engine start one or more times within a first threshold duration from the first attempt, and during a second condition, prompting, via a display device, a vehicle operator to engage a brake pedal within a second threshold duration from the first attempt and then upon brake pedal engagement, attempting the engine start one or more times within the first threshold duration from the first attempt, the first threshold duration longer than the second threshold duration. In the preceding example method, additionally or optionally, the first condition includes the brake pedal being engaged during the first attempt and the second condition includes the brake pedal not being engaged during the first attempt. In any or all of the preceding examples, additionally or optionally, each of the first attempt and the attempting engine start one or more times one or more includes cranking the engine via a starter motor while injecting fuel and initializing spark to one or more engine cylinders. In any or all of the preceding examples, the method further comprising, additionally or optionally, during each of the first condition and the second condition, in response to the engine not starting after attempting the engine start one or more times, prompting, via the display device, the vehicle operator to manually restart the engine by turning an ignition key to an On position. In any or all of the preceding examples, the method further comprising, additionally or optionally, engaging an electronic parking brake prior to the attempting engine start one or more times. In any or all of the preceding examples, additionally or optionally, the unsuccessful first attempt to restart the engine is made during an engine idle-stop following an increase in engine torque demand.

In yet another example, a system for a vehicle, comprises: a controller with computer readable instructions stored on non-transitory memory that when executed enable the controller to: in response to conditions being met for an engine idle-stop, suspend fueling and spark to one or more engine cylinders to idle-stop an engine, during the idle-stop, upon conditions being met for an engine restart, after carrying out a first engine restart attempt resulting in engine stall, prompt an user, via an on-board human machine interface (HMI), to apply a brake pedal with a threshold duration since the first engine restart attempt, and upon application of the brake pedal, carry out a one or more successive engine restart attempts. In the preceding example system, additionally or optionally, a number of the one or more successive engine restart attempts are based on vehicle operating conditions including engine load and engine temperature. In any or all of the preceding example system, additionally or optionally, the controller includes further instructions to: in response to the engine not starting after the one or more successive engine restart attempts, prompt the user, via the HMI, to manually restart the engine by switching on an ignition key.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an engine executed via instructions stored on a controller, the method comprising:
via the controller, determining an unsuccessful first attempt to restart the engine from an engine idle-stop condition, wherein the controller determines the unsuccessful first attempt responsive to a speed of the engine not increasing to a threshold speed and the engine being unable to sustain operation via combustion after cranking the engine for a threshold cranking duration,
during a first condition following the unsuccessful first attempt where a brake pedal is engaged, attempting an engine start one or more times within a first threshold duration from the unsuccessful first attempt, and
during a second condition following the unsuccessful first attempt where the brake pedal is not engaged, prompting, via a display device, a vehicle operator to engage the brake pedal within a second threshold duration from the unsuccessful first attempt and then, upon brake pedal engagement, attempting the engine start one or more times within the second threshold duration from the unsuccessful first attempt, the first threshold duration longer than the second threshold duration.

2. The method of claim 1, wherein each of the unsuccessful first attempt and attempting the engine start one or more times includes cranking the engine via a starter motor while injecting fuel and initializing spark to one or more engine cylinders.

3. The method of claim 1, further comprising, during each of the first condition and the second condition, in response to the engine not starting after attempting the engine start one or more times, prompting, via the display device, the vehicle operator to manually restart the engine by turning an ignition key to an On position.

4. The method of claim 1, further comprising engaging an electronic parking brake prior to attempting the engine start one or more times.

5. The method of claim 1, wherein the unsuccessful first attempt to restart the engine is made from the engine idle-stop condition following an increase in engine torque demand.

6. The method of claim 1, wherein the second threshold duration is pre-calibrated based on one or more vehicle operating conditions comprising an engine temperature, an engine load, and emissions regulations.

7. The method of claim 1, further comprising manually restarting the engine following the second threshold duration.

8. The method of claim 7, wherein manually restarting the engine comprises instructing the vehicle operator to shift to a park gear and actuate an ignition key or ignition button.

9. The method of claim 1, further comprising determining the engine start is successful in response to the speed of the engine reaching and being able to sustain the threshold speed via combustion.

10. The method of claim 9, further comprising, in response to the speed of the engine not reaching the threshold speed following the first condition or the second condition, instructing the vehicle operator to manually restart the engine.

11. The method of claim 1, wherein the unsuccessful first attempt further comprises a battery state of charge being below a threshold state of charge.

12. The method of claim 1, further comprising detecting a request to start the engine prior to the unsuccessful first attempt, wherein the request is indicated via an accelerator pedal being depressed.

* * * * *